US008350662B2

(12) United States Patent
Abe et al.

(10) Patent No.: US 8,350,662 B2
(45) Date of Patent: *Jan. 8, 2013

(54) SEMICONDUCTOR CERAMIC AND POSITIVE TEMPERATURE COEFFICIENT THERMISTOR

(75) Inventors: Naoaki Abe, Nagaokakyo (JP); Hayato Katsu, Nagaokakyo (JP); Masato Goto, Nagaokakyo (JP); Atsushi Kishimoto, Nagaokakyo (JP); Akinori Nakayama, Nagaokakyo (JP)

(73) Assignee: Murata Manufacturing Co., Ltd., Nagaokakyo-Shi, Kyoto-fu (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/154,601

(22) Filed: Jun. 7, 2011

(65) Prior Publication Data

US 2011/0234364 A1    Sep. 29, 2011

Related U.S. Application Data

(63) Continuation of application No. PCT/JP2009/070760, filed on Dec. 11, 2009.

(30) Foreign Application Priority Data

Dec. 12, 2008  (JP) ................................. 2008-317476

(51) Int. Cl.
*H01C 7/10* (2006.01)
(52) U.S. Cl. .................................. 338/22 SD; 338/22 R
(58) Field of Classification Search .............. 338/22 SD, 338/22 R
See application file for complete search history.

(56) References Cited

U.S. PATENT DOCUMENTS

| | | | | |
|---|---|---|---|---|
| 6,911,102 B2* | 6/2005 | Niimi | .......................... | 156/89.14 |
| 7,295,421 B2* | 11/2007 | Mihara et al. | .............. | 361/308.1 |
| 7,649,437 B2* | 1/2010 | Mihara et al. | ............... | 338/22 R |
| 7,679,485 B2* | 3/2010 | Kishimoto et al. | .......... | 338/22 R |
| 7,764,161 B2 | 7/2010 | Katsu et al. | | |

FOREIGN PATENT DOCUMENTS

| | | |
|---|---|---|
| CN | 101013618 A | 8/2007 |
| CN | 101284731 | 10/2008 |
| JP | 55-095673 A | 7/1980 |
| JP | 56-169301 A | 12/1981 |
| JP | 05-275203 A | 10/1993 |
| JP | 10-152372 A | 6/1998 |

(Continued)

OTHER PUBLICATIONS

Machine translation of JP 2005-255493, Shimada et al., Sep. 22, 2005, Noemax Co Ltd.*
Blanchart, P., "Influence of Calcium Addition on the Microstructure and the Electrical Properties at Room Temperature of BaTiO$_3$ for PTC Thermistors", Silicates Industriels, 1991, vol. 59 (1-2), pp. 47-52.

(Continued)

*Primary Examiner* — Kyung Lee
(74) *Attorney, Agent, or Firm* — Dickstein Shapiro LLP

(57) ABSTRACT

A semiconductor ceramic includes a Ba$_m$TiO$_3$-based composition, as a main component, having a perovskite structure represented by general formula A$_m$BO$_3$, wherein part of Ba constituting the A site is replaced with Na, Bi, Ca, and a rare-earth element having an ionic radius smaller than that of the Na; the content of the rare-earth element when the total number of moles of the elements constituting the A site is 1 mole is 0.0005 to 0.015 on a molar basis; and the content of the Ca when the total number of moles of the elements constituting the A site is 1 mole is 0.05 to 0.20 (preferably 0.125 or more and 0.175 or less) on a molar basis. A PTC thermistor includes a component body 1 formed of the semiconductor ceramic. Accordingly, high reliability is achieved even if an alkali metal element is present.

18 Claims, 2 Drawing Sheets

FOREIGN PATENT DOCUMENTS

| | | |
|---|---|---|
| JP | 2005-255493 A | 9/2005 |
| JP | 2006179692 A | 7/2006 |
| JP | 2007001821 A | 1/2007 |
| JP | 2008063188 A | 3/2008 |
| WO | WO-2008-038538 A1 | 4/2008 |
| WO | WO-2008152976 A1 | 12/2008 |

OTHER PUBLICATIONS

Written Opinion of the International Searching Authority, mailed Feb. 16, 2010.

PCT/ISA/210 (Japanese), mailed Feb. 16, 2010.

* cited by examiner

SEMICONDUCTOR CERAMIC AND POSITIVE TEMPERATURE COEFFICIENT THERMISTOR

This is a continuation of application Serial No. PCT/JP2009/070760, filed Dec. 11, 2009, the contents of which is incorporated herein by reference.

TECHNICAL FIELD

The present invention relates to a semiconductor ceramic and a positive temperature coefficient thermistor, and specifically to a semiconductor ceramic having a positive temperature coefficient (hereinafter referred to as "PTC characteristic") and a positive temperature coefficient thermistor (hereinafter referred to as "PTC thermistor") used for heaters or the like.

BACKGROUND ART

A barium titanate ($BaTiO_3$)-based semiconductor ceramic generates heat as a result of application of a voltage and has PTC characteristics in which the resistance value rapidly increases when the temperature exceeds the Curie temperature Tc at which a phase transition from a tetragonal crystal to a cubic crystal takes place.

In such a semiconductor ceramic having PTC characteristics, the resistance value increases when the temperature exceeds the Curie temperature Tc due to the generation of heat caused by the application of a voltage. As a result, a current does not easily flow and the temperature is decreased. When the temperature is decreased and thus the resistance value is decreased, a current easily flows again and the temperature is increased. By repeating the above-described process in such a semiconductor ceramic, the temperature or current is caused to converge to a certain temperature or current. Therefore, such a semiconductor ceramic is widely used as a thermistor for heaters or motor starting devices.

Since a PTC thermistor used for a heater or the like is used at high temperature, the Curie temperature Tc is required to be high. Therefore, the Curie temperature Tc has been conventionally increased by replacing part of Ba in $BaTiO_3$ with Pb.

However, Pb is an environmentally unfriendly substance and thus, in consideration of environment, the development of a lead-free semiconductor ceramic that substantially does not contain Pb has been demanded.

For example, Patent Document 1 discloses a method for producing a $BaTiO_3$-based semiconductor ceramic, the method including adding at least one of Nb, Ta, and a rare-earth element to a structure of $Ba_{1-2x}(BiNa)_xTiO_3$ (where $0<x\leq0.15$) obtained by replacing a part of Ba of $BaTiO_3$ with Bi—Na, sintering the structure in a nitrogen atmosphere, and performing a heat treatment in an oxidizing atmosphere.

The lead-free $BaTiO_3$-based semiconductor ceramic of Patent Document 1 has a high Curie temperature Tc of 140 to 255° C. and a temperature coefficient of resistance of 16 to 20%/° C.

Patent Document 2 discloses a semiconductor ceramic composition whose composition formula is represented by $[(A1_{0.5}A2_{0.5})_x(Ba_{1-y}Q_y)_{1-x}]TiO_3$ (where A1 is at least one of Na, K, and Li, A2 is Bi, and Q is at least one of La, Dy, Eu, and Gd), wherein the x and y satisfy $0<x\leq0.2$ and $0.002\leq y\leq0.01$.

The lead-free semiconductor ceramic composition in Patent Document 2 has a Curie temperature Tc of 130° C. or more.

Patent Document 1: Japanese Unexamined Patent Application Publication No. 56-169301

Patent Document 2: Japanese Unexamined Patent Application Publication No. 2005-255493

Problems to be Solved by the Invention

A PTC thermistor used in a heater may be exposed to a high-humidity atmosphere for a long time, and therefore such a PTC thermistor is required to have high reliability to the extent that the degradation of its performance is prevented even in such a high-humidity atmosphere.

However, since the semiconductor ceramics disclosed in Patent Documents 1 and 2 contain an alkali metal element such as Na, Na ions may be eluted when the semiconductor ceramics are exposed to the high-humidity atmosphere for a long time.

When the semiconductor ceramics are exposed to a high-humidity atmosphere for a long time, the eluted Na ions react with water vapor contained in the atmosphere and sodium hydroxide is produced. The sodium hydroxide erodes the outer electrodes of the PTC thermistor, and may vary the resistance value (increase the resistance value). In addition, the eluted Na ions are segregated in the grain boundaries and thus the grain boundary resistance is increased. This may also vary the resistance value.

As described above, there is a problem in that the resistance value is degraded over time when the semiconductor ceramics disclosed in Patent Documents 1 and 2 are exposed to a high-humidity atmosphere for a long time, and thus reliability is impaired.

In view of the foregoing, an object of the present invention is to provide a semiconductor ceramic having high reliability even if an alkali metal element is contained therein and a PTC thermistor that uses the semiconductor ceramic.

Means for Solving the Problems

Through the intensive study of a $\{Ba,(Na,Bi),Ca,Ln)\}_m TiO_3$-based material (Ln being a rare-earth element) having a perovskite structure (general formula $A_m BO_3$), the inventors of the present invention have found that by dissolving a predetermined amount of rare-earth element having an ionic radius smaller than that of Na in the A site and setting the content of Ca in the A site to be 0.05 to 0.20 on a molar basis, there can be provided a semiconductor ceramic that has high reliability and in which the degradation of resistance can be suppressed even when the semiconductor ceramic is exposed to a high-humidity atmosphere for a long time.

The present invention is based on the finding described above. The semiconductor ceramic according to the present invention is a lead-free semiconductor ceramic that substantially does not contain Pb, the semiconductor ceramic including a $Ba_m TiO_3$-based composition, as a main component, having a perovskite structure represented by general formula $A_m BO_3$, wherein part of Ba constituting the A site is replaced with Na, Bi, Ca, and a rare-earth element having an ionic radius smaller than that of the Na; the content of the rare-earth element when the total number of moles of the elements constituting the A site is 1 mole is 0.0005 to 0.015 on a molar basis; and the content of the Ca when the total number of moles of the elements constituting the A site is 1 mole is 0.05 to 0.20 on a molar basis.

In the semiconductor ceramic of the present invention, the content of the Ca is preferably 0.125 to 0.175 on a molar basis.

The rare-earth element is at least one member selected from the group consisting of Dy, Y, Ho, and Er in the semiconductor ceramic of the present invention.

A positive temperature coefficient thermistor according to the present invention includes a component body and a pair of outer electrodes formed on surfaces of the component body, wherein the component body is formed of the semiconductor ceramic described above.

Advantages

The semiconductor ceramic of the present invention includes a $Ba_mTiO_3$-based composition, as a main component, having a perovskite structure represented by general formula $A_mBO_3$, wherein part of Ba constituting the A site is replaced with Na, Bi, Ca, and a rare-earth element having an ionic radius smaller than that of the Na; the content of the rare-earth element when the total number of moles of the elements constituting the A site is 1 mole is 0.0005 to 0.015 on a molar basis; and the content of the Ca when the total number of moles of the elements constituting the A site is 1 mole is 0.05 to 0.20 (preferably 0.125 to 0.175) on a molar basis. Therefore, there can be provided a semiconductor ceramic in which the degradation of resistance over time can be suppressed even when the semiconductor ceramic is exposed to high-humidity for a long time.

The PTC thermistor of the present invention includes a component body and a pair of outer electrodes formed on surfaces of the component body, wherein the component body is formed of the semiconductor ceramic described above. Therefore, there can be provided a PTC thermistor having high reliability.

Specifically, there can be provided a lead-free PTC thermistor that has high reliability and in which the percentage change in resistivity can be suppressed to 30% or less even when the PTC thermistor is kept in a high-humidity atmosphere of 85% RH for 1000 hours.

Figure 1:
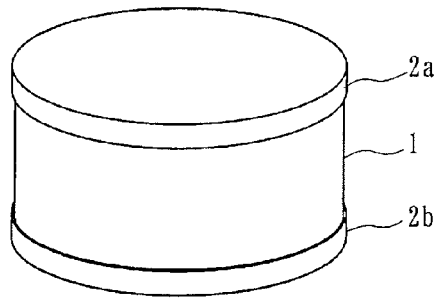
FIG. 1 is a perspective view showing an embodiment of a PTC thermistor according to the present invention.

An embodiment of the present invention will now be described.

The Main component of a semiconductor ceramic according to an embodiment of the present invention has a perovskite structure represented by general formula (A).

$(Ba_{1-w-x-y-z}Na_wBi_xCa_yLn_z)_mTiO_3$     (A)

Ln is a rare-earth element serving as a semiconductorizing agent. In this embodiment, a rare-earth element having an ionic radius smaller than that of Na is used.

By adding a rare-earth element Ln having an ionic radius smaller than that of Na in such a manner, the Na is more stably dissolved in the A site (Ba site) and thus a variation in resistance over time can be suppressed even if the semiconductor ceramic is exposed in a high-humidity atmosphere for a long time.

In the case where Ba ions in the A site are replaced with another element, an element having an ionic radius closer to that of Ba ions is easily replaced with Ba ions and dissolved in the A site, and an element having an ionic radius different from that of Ba ions is not easily replaced with Ba ions.

Thus, when a rare-earth element Ln added as a semiconductorizing agent and has an ionic radius smaller than that of Na ions is on the point of being dissolved in the A site, and Na ions having an ionic radius closer to that of Ba ions are easily dissolved in the A site more selectively than the rare-earth element Ln. The Na ions are stably dissolved in the A site, whereby precipitation of the Na ions in grain boundaries can be suppressed. Thus, a variation in resistance over time can be suppressed even if the semiconductor ceramic is exposed in a high-humidity atmosphere for a long time, and reliability can be improved.

In addition, since Ca ions have an ionic radius smaller than that of Ba ions, the size of a crystal lattice is decreased by replacing part of Ba with Ca and thus the Na is more easily dissolved in the A site. Consequently, a variation in resistance over time can be suppressed even if the semiconductor ceramic is exposed in a high-humidity atmosphere for a long time, and reliability can be improved.

A rare-earth element Ln having an ionic radius larger than that of Na ions, such as La, is not preferred because the effect, produced by Ca, of decreasing a lattice constant is eliminated.

Specific examples of the rare-earth element Ln having an ionic radius smaller than that of Na ions include Dy, Y, Ho, and Er.

Table 1 shows ionic radii of various elements.

TABLE 1

| Element | Ionic radius (Å) | Element | Ionic radius (Å) |
|---------|------------------|---------|------------------|
| $Ba^{2+}$ | 1.49 | $La^{3+}$ | 1.17 |
| $Na^+$ | 1.16 | $Dy^{3+}$ | 1.05 |
| $Bi^{3+}$ | 1.17 | $Y^{3+}$ | 1.04 |
| $Ca^{3+}$ | 1.14 | $Ho^{3+}$ | 1.04 |
| — | — | $Er^{3+}$ | 1.03 |

Cited from R. D. Shanon, "Acta. Crystallography" A, vol. 32 p. 751 (1976)

The size of ionic radii of the present invention is compared using ionic radii of six-coordination.

As is clear from Table 1, Ba and Na have a relatively large difference in ionic radius, and Na and Ca have substantially the same ionic radius. Dy, Y, Ho, and Er each have an ionic radius smaller than that of Na. La has an ionic radius larger than that of Na.

By using Dy, Y, Ho, or Er as a rare-earth element Ln and replacing part of Ba with Ca, precipitation of Na in the grain boundaries is suppressed and Na is stably dissolved in the A site. Consequently, the reliability in a high-humidity atmosphere can be ensured.

In addition, the resistance value of a semiconductor ceramic can be decreased since part of Ba is replaced with Ca as described below.

In this embodiment, the molar amount y of Ca and the molar amount z of rare-earth element Ln in the general formula (A) satisfy mathematical formulas (1) and (2), respectively.

$$0.05 \leq y \leq 0.20 \quad (1)$$

$$0.0005 \leq z \leq 0.015 \quad (2)$$

The reasons why y and z are set so as to satisfy the mathematical formulas (1) and (2) will now be described.

(1) Molar Amount y of Ca

As described above, since Ca has an ionic radius smaller than that of Ba, the Ca produces an effect of decreasing the size of the crystal lattice in cooperation with the effect of the rare-earth element Ln having an ionic radius smaller than that of Na. As a result, Na ions are easily dissolved in the A site and the precipitation of Na in the grain boundaries is suppressed, which contributes to the improvement in reliability.

In addition, the ratio of the c axis to the a axis among the crystallographic axes is increased by replacing part of Ba with Ca, and thus the tetragonal crystallinity of the crystal is improved. As a result, spontaneous polarization is increased and the grain boundary barrier can be eliminated. This can decrease the resistance value of the semiconductor ceramic and thus a PTC thermistor suitably used for a heater or the like can be obtained.

However, if the molar amount y of Ca in the A site is less than 0.05, the content of Ca is excessively low and the size of the crystal lattice cannot be sufficiently decreased. Consequently, Na ions and Bi ions having an ionic radius smaller than that of Ba ions are precipitated in the grain boundaries. Therefore, when the semiconductor ceramic is exposed in a high-humidity atmosphere for a long time, the precipitated Na ions having a small ionic radius may be eluted in the form of Na ions through the reaction with water vapor contained in the atmosphere. Such Na ions may erode the outer electrodes of a PTC thermistor or increase the grain boundary resistance to increase the resistance value. Thus, the degradation of resistance over time may be caused.

On the other hand, if the molar amount y of Ca is more than 0.20, the solid solubility limit of Ca is exceeded and a large number of heterophases are precipitated in the grain boundaries or at the crystal triple points. Since the heterophases are unstable, they are eluted or react with carbon dioxide or the like in the air when the semiconductor ceramic is exposed in a high-humidity atmosphere for a long time. As a result, the resistance value is increased, which may cause a variation in resistance.

Accordingly, the composition is determined so that the molar ratio y of Ca in the A site is 0.05 to 0.20. To further improve reliability, the molar ratio y is preferably 0.125 to 0.175.

(2) Molar Amount z of Rare-Earth Element Ln

Since the rare-earth element Ln serves as a semiconductorizing agent and a rare-earth element Ln having an ionic radius smaller than that of Na is used as described above, reliability can be ensured even in a high-humidity atmosphere.

However, the content of the rare-earth element Ln is excessively low if the molar amount z of rare-earth element Ln is less than 0.0005. Therefore, the amount of Na precipitated in the grain boundaries without being dissolved in the A site is increased.

On the other hand, the reliability in a high-humidity atmosphere may be decreased if the molar amount z of rare-earth element Ln is more than 0.015.

Accordingly, the composition is determined so that the molar amount z of rare-earth element Ln satisfies $0.0005 \leq z \leq 0.015$.

The molar ratio m between the A site containing Ba and the B site containing Ti is not particularly limited. When the molar ratio m is 0.992 to 1.004, satisfactory PTC characteristics can be achieved.

Regarding the molar amount w of Na and the molar amount x of Bi in the A site, the total molar amount (w+x) is preferably 0.02 to 0.20. If the total molar amount (w+x) is less than 0.02, the Curie temperature Tc cannot be sufficiently increased because the Curie temperature Tc is increased by replacing part of Ba with Na and Bi. If the total molar amount (w+x) is more than 0.20, the composition is easily shifted from a theoretical composition of a sintered body because Na and Bi are easily volatilized. Any amount of each of Na and Bi can be employed as long as the combined amount is 0.02 to 0.2.

In the present invention, 0.0001 to 0.0020 parts by mole of Mn is preferably added relative to 1 part by mole of main component represented by the general formula (A) to improve PTC characteristics.

In this case, the semiconductor ceramic is represented by general formula (B).

$$(Ba_{1-w-x-y-z}Na_wBi_xCa_yLn_z)_mTiO_3+nMn \quad (B)$$

where n satisfies $0.0001 \leq n \leq 0.0020$.

Mn functions as an acceptor. Therefore, an acceptor level is formed in the grain boundaries and thus the number of PTC digits can be increased by adding Mn within the range described above. As a result, the PTC characteristics can be further improved.

The form of Mn added is not particularly limited, and any manganese compound such as a sol or powder of manganese oxide or an aqueous manganese nitrate solution can be used.

A PTC thermistor that uses the above-described semiconductor ceramic will now be specifically described.

FIG. 1 is a perspective view schematically showing an embodiment of the PTC thermistor.

The PTC thermistor includes a component body 1 formed of the above-described semiconductor ceramic and a pair of outer electrodes 2a and 2b formed on both ends (surfaces) of the component body 1. The outer electrodes 2a and 2b have a single-layer structure or a multi-layer structure composed of a conductive material such as Cu, Ni, Al, Cr, a Ni—Cr alloy, or a Ni—Cu alloy.

In this embodiment, the external appearance has a columnar shape, but may have a disc-like shape or a rectangular parallelepiped shape.

A method for producing the PTC thermistor will now be described.

First, a Ba compound, a Ca compound, a Na compound, a Bi compound, and a Ln compound containing a predetermined rare-earth element Ln are prepared as raw materials. The raw materials are weighed and mixed to obtain a mixed powder so that the semiconductor ceramic has a predetermined composition ratio.

Subsequently, an organic solvent and a polymer-based dispersant are added to the mixed powder and thoroughly mixed and ground by a wet method in a ball mill using grinding media such as PSZ (partially stabilized zirconia) balls. The solvent is then removed by drying, and sizing is performed using a mesh having a predetermined opening. The mixture is subjected to a heat treatment at 800 to 1000° C. for 2 hours to obtain a calcined powder. A vinyl acetate-based organic binder and pure water, and optionally a Mn compound, are added to the calcined powder and thoroughly mixed and ground again using grinding media to obtain a slurry. The resultant slurry is dried to obtain a raw material powder. The raw material powder is then sized using a mesh having a predetermined opening and compression-molded using a press, such as a uniaxial press, to obtain a compact.

The compact is subjected to a debinding treatment at 500 to 600° C. in an air atmosphere, a nitrogen atmosphere, or a mixed stream of air and nitrogen. Subsequently, the compact is fired in a nitrogen atmosphere whose oxygen concentration is 100 to 10000 ppm by volume at a temperature that achieves semiconductorization, e.g., at a maximum firing temperature of 1250 to 1450° C. for a predetermined time to obtain a component body 1, which is a sintered body.

Outer electrodes 2a and 2b are formed on both ends of the component body 1 by plating, sputtering, electrode baking, or the like to produce a PTC thermistor.

The present invention is not limited to the above-described embodiment. For example, the semiconductor ceramic needs only to be mainly composed of $Ba_mTiO_3$ and part of Ba needs only to be replaced with predetermined amounts of Na, Bi, Ca, and a rare-earth element serving as a semiconductorizing agent. Even if incidental impurities are present, the characteristics are not affected. For example, about 0.2 to 0.3% by weight of the PSZ balls in total used as grinding media when mixing and grinding are performed by a wet method may remain present, but this does not affect the characteristics. Similarly, trace amounts, such as about 10 ppm by weight, of Fe, Si, and Cu may be present in the raw materials, but this does not affect the characteristics.

The semiconductor ceramic of the present invention is a lead-free semiconductor ceramic. As described in Means for Solving the Problems, it is only required that the semiconductor ceramic substantially does not contain Pb, and Pb incidentally present in a concentration of about 10 ppm or less by weight is not necessarily excluded as long as it does not affect the characteristics.

Examples of the present invention will now be specifically described.

$BaCO_3$, $CaCO_3$, $Na_2CO_3$, $Bi_2O_3$, $TiO_2$, $La_2O_3$, $Dy_2O_3$, $Y_2O_3$, $Ho_2O_3$, and $Er_2O_3$, which were raw materials of a main component, were prepared and then weighed and mixed to obtain a mixed powder so that the sintered body had the composition shown in Table 2.

Subsequently, ethanol (organic solvent) and a polymer-based dispersant were added to the mixed powder and mixed and ground in a ball mill using PSZ balls for 24 hours. The ethanol was removed by drying, and sizing was performed using a mesh having an opening of 300 μm. The mixture was subjected to a heat treatment at 800 to 1000° C. for 2 hours to obtain a calcined powder.

A vinyl acetate-based organic binder and an aqueous manganese nitrate solution were added to the calcined powder and mixed and ground by a wet method in a ball mill using PSZ balls for 16 hours to obtain a slurry. The amount of the aqueous manganese nitrate solution added was adjusted to be 0.00025 parts by mole on a Mn basis relative to 1 part by mole of main component.

The slurry was dried and sized using a mesh having an opening of 300 μm to obtain a raw material powder.

The raw material powder was compression-molded using a uniaxial press at a pressure of $9.8 \times 10^7$ Pa (1000 kgf/cm$^2$) to obtain a disc-shaped compact having a diameter of 14 mm and a thickness of 2.5 mm.

The disc-shaped compact was subjected to a debinding treatment in the air at 600° C. for 2 hours. The compact was fired in a nitrogen atmosphere whose oxygen concentration was 100 ppm by volume at a maximum firing temperature of 1250 to 1400° C. for 2 hours to obtain semiconductor ceramics with a sample number of 1 to 5.

Subsequently, the fired samples were lapped and then subjected to dry plating to form outer electrodes having a three-layer structure of NiCr/NiCu/Ag. Consequently, sample Nos. 1 to 5 were prepared.

Regarding the sample Nos. 1 to 5, the electrical resistivity $\rho_0$ at 25° C. (room temperature), the number of digits of PTC ΔR, and the Curie temperature Tc were determined.

The electrical resistivity $\rho_0$ was measured by a direct current four-terminal method through the application of a voltage of 1 V at 25° C.

The number of digits of PTC ΔR indicates the performance of a PTC thermistor, and is defined by the logarithm of the ratio between the maximum value ρmax and the minimum value ρmin of electrical resistivity as represented by mathematical formula (3).

$$\Delta R = \log(\rho max/\rho min) \quad (3)$$

Therefore, the characteristics (hereinafter referred to as "ρ-T characteristics") between temperature T and electrical resistivity ρ were measured, and the number of digits of PTC was determined using the maximum value and the minimum value.

The Curie temperature Tc was defined as a temperature at which the electrical resistivity $\rho_0$ at room temperature was doubled, and determined from the ρ-T characteristics.

Furthermore, a humidity test was performed to evaluate reliability. Five specimens for each of the samples were left in a constant temperature and humidity chamber at 85° C. and 85% RH for 1000 hours. The electrical resistivity $\rho_1$ after the humidity test was measured at 25° C., and the difference $\Delta\rho(=\rho_1-\rho_0)$ between the electrical resistivity $\rho_1$ after the test and the electrical resistivity $\rho_0$ before the test was determined. The percentage change in resistivity $\Delta\rho/\rho_0$ was calculated for the five specimens, and the reliability was evaluated using the average value of the percentage changes in resistivity $\Delta\rho/\rho_0$.

Table 2 shows the compositions and measurement results of the sample Nos. 1 to 5.

Samples having a percentage change in resistivity $\Delta\rho/\rho_0$ of 30% or less were judged as good.

TABLE 2

Composition formula: $(Ba_{0.749}Na_{0.05}Bi_{0.05}Ca_{0.15}Ln_{0.001})TiO_3 + 0.00025Mn$

| Sample No. | Ln | Electrical resistivity $\rho_0$ (Ω·cm) | Number of digits of PTC ΔR | Curie temperature Tc (°C.) | Percentage change in resistivity $\Delta\rho/\rho_0$ (%) |
|---|---|---|---|---|---|
| 1* | La | 9 | 4.5 | 164 | 620 |
| 2 | Dy | 15 | 4.3 | 157 | 21 |
| 3 | Y | 10 | 5.1 | 159 | 15 |
| 4 | Ho | 21 | 4.7 | 151 | 23 |
| 5 | Er | 31 | 4.2 | 152 | 14 |

*Outside the scope of the present invention

The sample No. 1 had an extremely high percentage change in resistivity $\Delta\rho/\rho_0$ of 620%. This reason is believed to be as follows. Since La (ionic radius: 1.17 Å) having an ionic radius larger than that of Na (ionic radius: 1.16 Å) was used as the rare-earth element Ln serving as a semiconductorizing agent, Na was not stably coordinated in the A site and was precipitated in the grain boundaries. As a result, the variation in resistance was increased after the humidity test.

In contrast, each of the rare-earth elements Ln used in the sample Nos. 2 to 5 (Dy: 1.05 Å, Y: 1.04 Å, Ho: 1.04 Å, Er: 1.03 Å) had an ionic radius smaller than that of Na, and the molar amount z of rare-earth element Ln and the molar amount y (=0.15) of Ca in the A site were within the scope of the present invention. Therefore, the percentage change in resistivity $\Delta\rho/\rho_0$ was a satisfactory value of 30% or less, specifically 14 to 23%. In addition, the electrical resistivity $\rho_0$ was 40 Ω·cm or less, specifically 10 to 31 Ω·cm.

In Example 2, various samples containing Dy (molar ratio: 0.002) as the rare-earth element Ln and obtained by changing the molar amount y of Ca were prepared, and the characteristics were evaluated.

$BaCO_3$, $CaCO_3$, $Na_2CO_3$, $Bi_2O_3$, $TiO_2$, and $Dy_2O_3$, which were raw materials of a main component, were prepared and then weighed and mixed to obtain a mixed powder so that the sintered body had the composition shown in Table 3.

After that, sample Nos. 11 to 19 were prepared by the same method and process as those in Example 1 but the firing process was performed in a nitrogen atmosphere whose oxygen concentration was 5000 ppm by volume.

Regarding the sample Nos. 11 to 19, the electrical resistivity $\rho_0$ at 25° C. (room temperature), the number of digits of PTC ΔR, the Curie temperature Tc, and the percentage change in resistivity Δρ/ρ$_0$ were determined by the same method and process as those in [Example 1].

Table 3 shows the compositions and measurement results of the sample Nos. 11 to 19.

As in Example 1, samples having a percentage change in resistivity Δρ/ρ$_0$ of 30% or less were judged as good.

TABLE 3

Composition formula:
$(Ba_{0.898-y}Na_{0.05}Bi_{0.05}Ca_yDy_{0.002})TiO_3 + 0.00025Mn$

| Sample No. | y | Electrical resistivity ρ$_0$ (Ω·cm) | Number of digits of PTC ΔR | Curie temperature Tc (°C.) | Percentage change in resistivity Δρ/ρ$_0$ (%) |
|---|---|---|---|---|---|
| 11* | 0 | 157 | 3.9 | 181 | 165 |
| 12* | 0.02 | 58 | 3.7 | 176 | 67 |
| 13 | 0.05 | 26 | 3.9 | 173 | 29 |
| 14 | 0.10 | 21 | 4.1 | 165 | 21 |
| 15 | 0.125 | 17 | 4.0 | 161 | 14 |
| 16 | 0.15 | 14 | 4.4 | 154 | 11 |
| 17 | 0.175 | 19 | 4.7 | 150 | 12 |
| 18 | 0.20 | 38 | 5.1 | 146 | 19 |
| 19* | 0.25 | 133 | 4.9 | 139 | 39 |

*Outside the scope of the present invention

Sample No. 11 had a high electrical resistivity ρ$_0$ of 157 Ω·cm and a high percentage change in resistivity Δρ/ρ$_0$ of 165%. This may be because Ca was not contained and thus the size of a crystal lattice was large, and Na ions and Bi ions having an ionic radius smaller than that of Ba ions were easily precipitated in the grain boundaries.

Sample No. 12 had a high percentage change in resistivity Δρ/ρ$_0$ of 67%. This is because, since the molar amount y of Ca was an excessively low value of 0.02, the same phenomenon as that of the sample No. 11 occurred.

Sample No. 19 had a high percentage change in resistivity Δρ/ρ$_0$ of 39%. This is because, since the molar amount y of Ca was an excessively high value of 0.25, Ca whose solid solubility limit was exceeded was precipitated in the grain boundaries or at the crystal triple points.

In contrast, in the sample Nos. 13 to 18, have a molar amount y of Ca of 0.05 to 0.20 and Dy having an ionic radius smaller than that of Na was present within the composition range of the present invention. Therefore, the percentage change in resistivity Δρ/ρ$_0$ could be suppressed to 30% or less and thus the reliability in a high-humidity atmosphere could be ensured. The electrical resistivity ρ$_0$ was also a satisfactory value of 40 Ω·cm or less. In particular, sample Nos. 15 to 17 in which the molar amount y of Ca was 0.125 to 0.175 had a low percentage change in resistivity Δρ/ρ$_0$ of 15% or less and an electrical resistivity ρ$_0$ of 20 Ω·cm or less. Consequently, it was found that a PTC thermistor having more satisfactory PTC characteristics and higher reliability could be obtained.

In Example 3, various samples containing Y (molar amount: 0.002) as the rare-earth element Ln and obtained by changing the molar amount y of Ca were prepared, and the characteristics were evaluated.

$BaCO_3$, $CaCO_3$, $Na_2CO_3$, $Bi_2O_3$, $TiO_2$ and $Y_2O_3$, which were raw materials of a main component, were prepared and then weighed and mixed to obtain a mixed powder so that the sintered body had the composition shown in Table 4.

After that, sample Nos. 21 to 29 were prepared by the same method and process as those in Example 1 except that the firing process was performed in a nitrogen atmosphere whose oxygen concentration was 5000 ppm by volume, as in Example 2.

Regarding the sample Nos. 21 to 29, the electrical resistivity ρ$_0$ at 25° C. (room temperature), the number of digits of PTC ΔR, the Curie temperature Tc, and the percentage change in resistivity Δρ/ρ$_0$ were determined by the same method and process as those in Example 1.

Table 4 shows the compositions and measurement results of the sample Nos. 21 to 29.

As in Example 1, samples having a percentage change in resistivity Δρ/ρ$_0$ of 30% or less were judged as good.

TABLE 4

Composition formula:
$(Ba_{0.898-y}Na_{0.05}Bi_{0.05}Ca_yY_{0.002})TiO_3 + 0.00025Mn$

| Sample No. | y | Electrical resistivity ρ$_0$ (Ω·cm) | Number of digits of PTC ΔR | Curie temperature Tc (°C.) | Percentage change in resistivity Δρ/ρ$_0$ (%) |
|---|---|---|---|---|---|
| 21* | 0 | 69 | 3.7 | 180 | 99 |
| 22* | 0.025 | 54 | 3.7 | 177 | 56 |
| 23 | 0.05 | 38 | 4.3 | 174 | 24 |
| 24 | 0.10 | 24 | 4.3 | 167 | 17 |
| 25 | 0.125 | 13 | 4.5 | 162 | 11 |
| 26 | 0.15 | 12 | 4.8 | 158 | 8 |
| 27 | 0.175 | 13 | 5.2 | 153 | 10 |
| 28 | 0.20 | 39 | 5.3 | 143 | 17 |
| 29* | 0.25 | 114 | 4.8 | 137 | 51 |

*Outside the scope of the present invention

Sample No. 21 had a high percentage change in resistivity Δρ/ρ$_0$ of 99%. This may be because, Na ions and Bi ions having an ionic radius smaller than that of Ba ions were easily precipitated in the grain boundaries since Ca was not present and thus the size of a crystal lattice was large, as in the sample No. 11 of Example 2.

Sample No. 22 had a high percentage change in resistivity Δρ/ρ$_0$ of 56%. This is because, since the molar amount y of Ca was an excessively low value of 0.025, the same phenomenon as that of the sample No. 21 occurred.

Sample No. 29 had a high percentage change in resistivity Δρ/ρ$_0$ of 51%. This is because, since the molar amount y of Ca was an excessively high value of 0.25, the Ca whose solid solubility limit was exceeded and it was precipitated in the grain boundaries or at the crystal triple points.

In contrast, the molar amount y of Ca was 0.05 to 0.20 and Y having an ionic radius smaller than that of Na was present within the composition range of the present invention in the sample Nos. 23 to 28. Therefore, the percentage change in resistivity Δρ/ρ$_0$ could be suppressed to 30% or less and thus the reliability in a high-humidity atmosphere could be ensured. The electrical resistivity ρ$_0$ was also a satisfactory value of 40 Ω·cm or less. In particular, the sample Nos. 25 to 27 in which the molar amount y of Ca was 0.125 to 0.175 had a low percentage change in resistivity Δρ/ρ$_0$ of 15% or less and an electrical resistivity ρ$_0$ of 20 Ω·cm or less. Consequently, it was found that a PTC thermistor having more satisfactory PTC characteristics and higher reliability could be obtained.

In Example 4, various samples containing La as the rare-earth element Ln and obtained by changing the molar amount z of La were prepared, and the characteristics were evaluated.

$BaCO_3$, $CaCO_3$, $Na_2CO_3$, $Bi_2O_3$, $TiO_2$, and $La_2O_3$, which were raw materials of a main component, were prepared and then weighed and mixed to obtain a mixed powder so that the sintered body had the composition shown in Table 5.

After that, sample Nos. 31 to 36 were prepared by the same method and process as those in Example 1. The firing process was performed in a nitrogen atmosphere whose oxygen concentration was 100 ppm by volume as in Example 1.

Regarding the sample Nos. 31 to 36, the electrical resistivity $\rho_0$ at 25° C. (room temperature), the number of digits of PTC $\Delta R$, the Curie temperature Tc, and the percentage change in resistivity $\Delta\rho/\rho_0$ were determined by the same method and process as those in Example 1.

Table 5 shows the compositions and measurement results of the sample Nos. 31 to 36. The composition and measurement results of the sample No. 1 are also shown for comparison.

As in Example 1, samples having a percentage change in resistivity $\Delta\rho/\rho_0$ of 30% or less were judged as good.

TABLE 5

Composition formula:
$(Ba_{0.75-z}Na_{0.05}Bi_{0.05}Ca_{0.15}La_z)TiO_3 + 0.00025Mn$

| Sample No. | z | Electrical resistivity $\rho_0$ ($\Omega \cdot cm$) | Number of digits of PTC $\Delta R$ | Curie temperature Tc (° C.) | Percentage change in resistivity $\Delta\rho/\rho_0$ (%) |
|---|---|---|---|---|---|
| 1* | 0.001 | 9 | 4.5 | 164 | 620 |
| 31* | 0.0001 | 244 | 3.4 | 172 | 534 |
| 32* | 0.0005 | 74 | 3.7 | 169 | 372 |
| 33* | 0.005 | 27 | 3.9 | 151 | 314 |
| 34* | 0.01 | 64 | 3.4 | 135 | 378 |
| 35* | 0.015 | 86 | 3.1 | 117 | 231 |
| 36* | 0.02 | 156 | 3.4 | 111 | 427 |

*Outside the scope of the present invention

It was found from the sample Nos. 31 to 36 and the sample No. 1 that the percentage changes in resistivity $\Delta\rho/\rho_0$ were more than 200% even if the molar amount of La was changed, which meant that the resistance value was significantly increased after the humidity test. This may be because, since La (ionic radius: 1.17 Å) had an ionic radius larger than that of Na (ionic radius: 1.16 Å), Na was not stably coordinated in the A site and was precipitated in the grain boundaries. It is believed that as a result, a variation in resistance was increased after the humidity test.

In Example 5, various samples containing Dy as the rare-earth element Ln and obtained by changing the molar amount z of Dy were prepared, and the characteristics were evaluated.

$BaCO_3$, $CaCO_3$, $Na_2CO_3$, $Bi_2O_3$, $TiO_2$, and $Dy_2O_3$, which were raw materials of a main component, were prepared and then weighed and mixed in consideration of volatilization of $Na_2CO_3$ and $Bi_2O_3$ to obtain a mixed powder so that the sintered body had the composition shown in Table 6.

After that, sample Nos. 41 to 46 were prepared by the same method and process as those in Example 1. The firing process was performed in a nitrogen atmosphere whose oxygen concentration was 100 ppm by volume as in [Example 1].

Regarding the sample Nos. 41 to 46, the electrical resistivity $\rho_0$ at 25° C. (room temperature), the number of digits of PTC $\Delta R$, the Curie temperature Tc, and the percentage change in resistivity $\Delta\rho/\rho_0$ were determined by the same method and process as those in Example 1.

Table 6 shows the compositions and measurement results of the sample Nos. 41 to 46. The composition and measurement results of the sample No. 2 are also shown for comparison.

As in Example 1, samples having a percentage change in resistivity $\Delta\rho/\rho_0$ of 30% or less were judged as good.

TABLE 6

Composition formula:
$(Ba_{0.75-z}Na_{0.05}Bi_{0.05}Ca_{0.15}Dy_z)TiO_3 + 0.00025Mn$

| Sample No. | z | Electrical resistivity $\rho_0$ ($\Omega \cdot cm$) | Number of digits of PTC $\Delta R$ | Curie temperature Tc (° C.) | Percentage change in resistivity $\Delta\rho/\rho_0$ (%) |
|---|---|---|---|---|---|
| 2 | 0.001 | 15 | 4.3 | 157 | 21 |
| 41* | 0.0001 | 294 | 3.9 | 161 | 278 |
| 42 | 0.0005 | 39 | 4.1 | 160 | 29 |
| 43 | 0.005 | 22 | 4.4 | 154 | 17 |
| 44 | 0.01 | 28 | 3.4 | 155 | 16 |
| 45 | 0.015 | 37 | 2.9 | 153 | 14 |
| 46* | 0.02 | 74 | 2.7 | 155 | 34 |

*Outside the scope of the present invention

Sample No. 41 had a high percentage change in resistivity $\Delta\rho/\rho_0$ of 278% because the molar amount z of Dy was an excessively low value of 0.0001.

Sample No. 46 had a high percentage change in resistivity $\Delta\rho/\rho_0$ of 34% because the molar amount z of Dy was an excessively high value of 0.02.

In contrast, sample Nos. 42 to 45 contained Dy having an ionic radius smaller than that of Na at a molar ratio that was within the scope of the present invention, as in the sample No. 2. Therefore, the percentage change in resistivity $\Delta\rho/\rho_0$ obtained after the humidity test could be suppressed to 30% or less. In addition, the electrical resistivity $\rho_0$ was also confirmed to be decreased to 40 $\Omega \cdot cm$ or less.

In Example 6, various samples containing Y as the rare-earth element Ln and obtained by changing the molar amount z of Y were prepared, and the characteristics were evaluated.

$BaCO_3$, $CaCO_3$, $Na_2CO_3$, $Bi_2O_3$, $TiO_2$, and $Y_2O_3$, which were raw materials of a main component, were prepared and then weighed and mixed to obtain a mixed powder so that the sintered body had the composition shown in Table 7.

After that, sample Nos. 51 to 57 were prepared by the same method and process as those in Example 1. The firing process was performed in a nitrogen atmosphere whose oxygen concentration was 100 ppm by volume as in Example 1.

Regarding the sample Nos. 51 to 57, the electrical resistivity $\rho_0$ at 25° C. (room temperature), the number of digits of PTC $\Delta R$, the Curie temperature Tc, and the percentage change in resistivity $\Delta\rho/\rho_0$ were determined by the same method and process as those in Example 1.

Table 7 shows the compositions and measurement results of the sample Nos. 51 to 57. The composition and measurement results of the sample No. 3 are also shown for comparison.

As in Example 1, samples having a percentage change in resistivity $\Delta\rho/\rho_0$ of 30% or less were judged as good.

TABLE 7

Composition formula:
$(Ba_{0.75-z}Na_{0.05}Bi_{0.05}Ca_{0.15}Y_z)TiO_3 + 0.00025Mn$

| Sample No. | z | Electrical resistivity $\rho_0$ ($\Omega \cdot cm$) | Number of digits of PTC $\Delta R$ | Curie temperature Tc (° C.) | Percentage change in resistivity $\Delta\rho/\rho_0$ (%) |
|---|---|---|---|---|---|
| 3 | 0.001 | 10 | 5.1 | 159 | 15 |
| 51* | 0.0001 | 194 | 4.1 | 164 | 307 |
| 52 | 0.0005 | 36 | 4.9 | 162 | 17 |
| 53 | 0.002 | 8 | 4.8 | 158 | 11 |
| 54 | 0.005 | 18 | 4.5 | 157 | 7 |
| 55 | 0.01 | 24 | 3.7 | 159 | 5 |

TABLE 7-continued

Composition formula:
$(Ba_{0.75-z}Na_{0.05}Bi_{0.05}Ca_{0.15}Y_z)TiO_3 + 0.00025Mn$

| Sample No. | z | Electrical resistivity $\rho_0$ ($\Omega \cdot cm$) | Number of digits of PTC $\Delta R$ | Curie temperature Tc (°C.) | Percentage change in resistivity $\Delta\rho/\rho_0$ (%) |
|---|---|---|---|---|---|
| 56 | 0.015 | 31 | 3.2 | 157 | 9 |
| 57* | 0.02 | 76 | 3 | 158 | 42 |

*Outside the scope of the present invention

Sample No. 51 had a high percentage change in resistivity $\Delta\rho/\rho_0$ of 307% because the molar amount z of Y was an excessively low value of 0.0001.

Sample No. 57 had a high percentage change in resistivity $\Delta\rho/\rho_0$ of 42% because the molar amount z of Y was an excessively high value of 0.02.

In contrast, sample Nos. 52 to 56 contained Y having an ionic radius smaller than that of Na at a molar ratio that was within the scope of the present invention, as in the sample No. 3. Therefore, the percentage change in resistivity $\Delta\rho/\rho_0$ obtained after the humidity test could be suppressed to 30% or less. In addition, the electrical resistivity $\rho_0$ was also confirmed to be decreased to 40 $\Omega \cdot cm$ or less.

In Example 7, various samples containing Ho as the rare-earth element Ln and obtained by changing the molar amount z of Ho were prepared, and the characteristics were evaluated.

$BaCO_3$, $CaCO_3$, $Na_2CO_3$, $Bi_2O_3$, $TiO_2$, and $Ho_2O_3$, which were raw materials of a main component, were prepared and then weighed and mixed to obtain a mixed powder so that the sintered body had the composition shown in Table 8.

After that, sample Nos. 61 to 66 were prepared by the same method and process as those in Example 1. The firing process was performed in a nitrogen atmosphere whose oxygen concentration was 100 ppm by volume as in Example 1.

Regarding the sample Nos. 61 to 66, the electrical resistivity $\rho_0$ at 25° C. (room temperature), the number of digits of PTC $\Delta R$, the Curie temperature Tc, and the percentage change in resistivity $\Delta\rho/\rho_0$ were determined by the same method and process as those in Example 1.

Table 8 shows the compositions and measurement results of the sample Nos. 61 to 66. The composition and measurement results of the sample No. 4 are also shown for comparison.

As in Example 1, samples having a percentage change in resistivity $\Delta\rho/\rho_0$ of 30% or less were judged as good.

TABLE 8

Composition formula:
$(Ba_{0.75-z}Na_{0.05}Bi_{0.05}Ca_{0.15}Ho_z)TiO_3 + 0.00025Mn$

| Sample No. | z | Electrical resistivity $\rho_0$ ($\Omega \cdot cm$) | Number of digits of PTC $\Delta R$ | Curie temperature Tc (°C.) | Percentage change in resistivity $\Delta\rho/\rho_0$ (%) |
|---|---|---|---|---|---|
| 4 | 0.001 | 21 | 4.7 | 151 | 23 |
| 61* | 0.0001 | 276 | 3.7 | 157 | 134 |
| 62 | 0.0005 | 78 | 4.8 | 154 | 27 |
| 63 | 0.005 | 38 | 4.5 | 149 | 17 |
| 64 | 0.01 | 67 | 3.9 | 152 | 13 |
| 65 | 0.015 | 72 | 3.7 | 147 | 12 |
| 66* | 0.02 | 124 | 3.4 | 149 | 39 |

*Outside the scope of the present invention

Sample No. 61 had a high percentage change in resistivity $\Delta\rho/\rho_0$ of 134% because the molar amount z of Ho was an excessively low value of 0.0001.

Sample No. 66 had a high percentage change in resistivity $\Delta\rho/\rho_0$ of 39% because the molar amount z of Ho was an excessively high value of 0.02.

In contrast, sample Nos. 62 to 65 contained Ho having an ionic radius smaller than that of Na at a molar ratio that was within the scope of the present invention, as in the sample No. 4. Therefore, the percentage change in resistivity $\Delta\rho/\rho_0$ obtained after the humidity test could be suppressed to 30% or less. In addition, the electrical resistivity $\rho_0$ was also confirmed to be decreased to 80 $\Omega \cdot cm$ or less.

In Example 8, various samples containing Er as the rare-earth element Ln and obtained by changing the molar amount z of Er were prepared, and the characteristics were evaluated.

$BaCO_3$, $CaCO_3$, $Na_2CO_3$, $Bi_2O_3$, $TiO_2$, and $Er_2O_3$, which were raw materials of a main component, were prepared and then weighed and mixed to obtain a mixed powder so that the sintered body had the composition shown in Table 9.

After that, sample Nos. 71 to 76 were prepared by the same method and process as those in Example 1. The firing process was performed in a nitrogen atmosphere whose oxygen concentration was 100 ppm by volume as in Example 1.

Regarding the sample Nos. 71 to 76, the electrical resistivity $\rho_0$ at 25° C. (room temperature), the number of digits of PTC $\Delta R$, the Curie temperature Tc, and the percentage change in resistivity $\Delta\rho/\rho_0$ were determined by the same method and process as those in Example 1.

Table 9 shows the compositions and measurement results of the sample Nos. 71 to 76. The composition and measurement results of the sample No. 5 are also shown for comparison.

As in Example 1, samples having a percentage change in resistivity $\Delta\rho/\rho_0$ of 30% or less were judged as good.

TABLE 9

Composition formula:
$(Ba_{0.75-z}Na_{0.05}Bi_{0.05}Ca_{0.15}Er_z)TiO_3 + 0.00025Mn$

| Sample No. | z | Electrical resistivity $\rho_0$ ($\Omega \cdot cm$) | Number of digits of PTC $\Delta R$ | Curie temperature Tc (°C.) | Percentage change in resistivity $\Delta\rho/\rho_0$ (%) |
|---|---|---|---|---|---|
| 5 | 0.001 | 31 | 4.2 | 152 | 14 |
| 71* | 0.0001 | 311 | 3.1 | 154 | 97 |
| 72 | 0.0005 | 74 | 3.7 | 149 | 22 |
| 73 | 0.005 | 39 | 4.1 | 149 | 10 |
| 74 | 0.01 | 76 | 3.8 | 147 | 6 |
| 75 | 0.015 | 77 | 3.7 | 143 | 5 |
| 76* | 0.02 | 157 | 3.2 | 142 | 32 |

*Outside the scope of the present invention

Sample No. 71 had a high percentage change in resistivity $\Delta\rho/\rho_0$ of 97% because the molar amount z of Er was an excessively low value of 0.0001.

Sample No. 76 had a high percentage change in resistivity $\Delta\rho/\rho_0$ of 32% because the molar amount z of Er was an excessively high value of 0.02.

In contrast, the sample Nos. 72 to 75 contained Er having an ionic radius smaller than that of Na at a molar ratio that was within the scope of the present invention, as in the sample No. 5. Therefore, the percentage change in resistivity $\Delta\rho/\rho_0$ obtained after the humidity test could be suppressed to 30% or less. In addition, the electrical resistivity $\rho_0$ was also confirmed to be decreased to 80 $\Omega \cdot cm$ or less.

Figure 2:
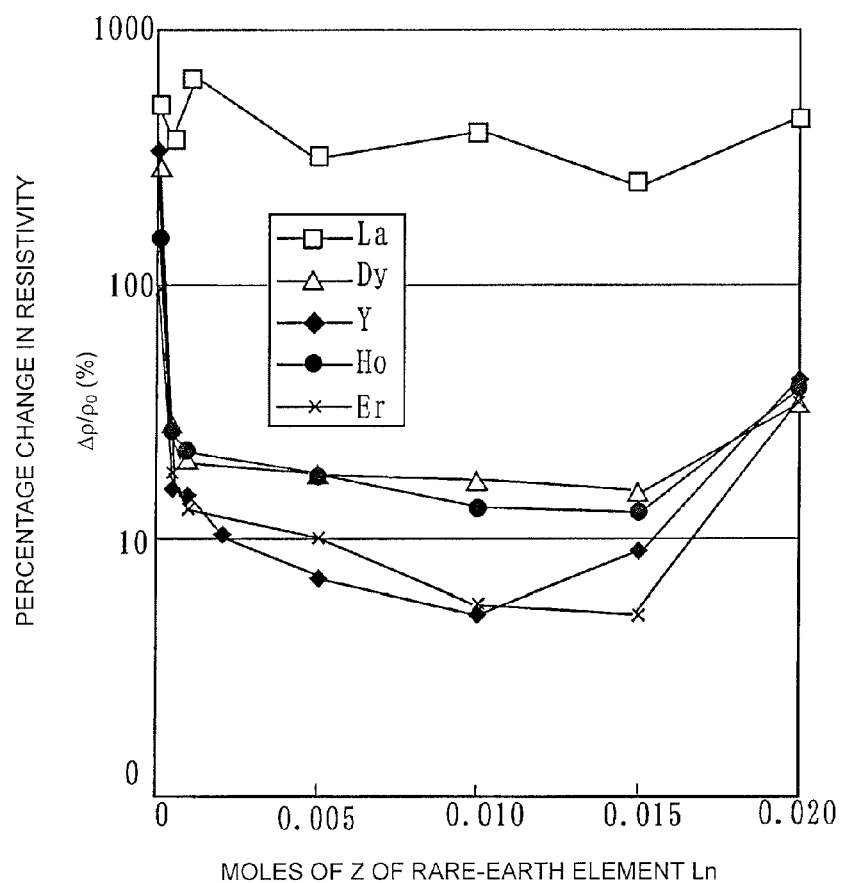
FIG. 2 is a diagram showing the relationship between the percentage change in resistivity $\Delta\rho/\rho_o$ and the molar ratio z of rare-earth elements Ln used in Examples 4 to 8.
Figure 3:
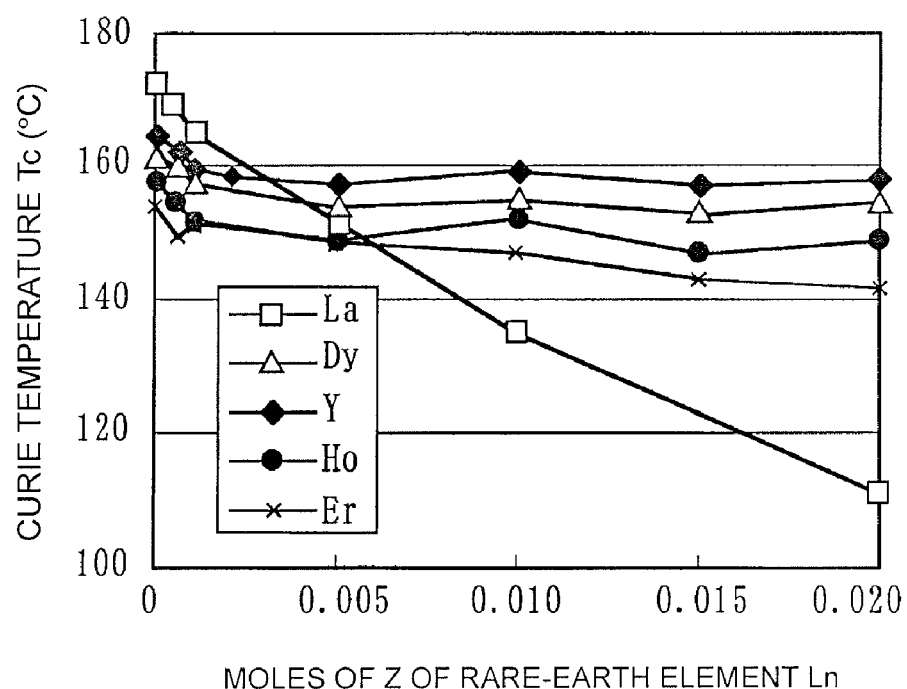
FIG. 3 is a diagram showing the relationship between the Curie temperature Tc and the molar ratio z of the rare-earth elements Ln used in Examples 4 to 8.

FIG. 2 is a diagram showing the relationship between the percentage change in resistivity $\Delta\rho/\rho_0$ and the molar amount z of rare-earth elements Ln used in Examples 4 to 8. FIG. 3 is a diagram showing the relationship between the Curie temperature Tc and the molar amount z of rare-earth elements Ln used in Examples 4 to 8. In the drawings, a solid-white square indicates La, a solid-white triangle indicates Dy, a solid-black diamond indicates Y, a solid-black circle indicates Ho, and a cross indicates Er.

As is clear from FIG. 2, the percentage change in resistivity $\Delta\rho/\rho_0$ obtained after the humidity test was an extremely high value of 230 to 620% in the case where La was present and thus desired reliability could not be achieved.

In contrast, it was found that when Dy, Y, Ho, or Er having an ionic radius smaller than that of Na was added at a molar amount z of 0.0005 to 0.015, the percentage change in resistivity $\Delta\rho/\rho_0$ obtained after the humidity test could be suppressed to 5 to 29% and high reliability could be achieved.

FIG. 3 shows that in the case where La was present, the Curie temperature was significantly decreased along with an increase in the molar amount z. In contrast, it was found that when Dy, Y, Ho, or Er, each of which was within the scope of the present invention, was used, a desired high Curie temperature could be maintained at a molar ratio z of 0.0005 to 0.015.

When a rare-earth element is added to a $BaTiO_3$-based material, the Curie temperature Tc is normally decreased, as in the case where La is present. However, it was found that when Dy, Y, Ho, or Er, each of which was a rare-earth element within the scope of the present invention, was added in a predetermined amount, the Curie temperature Tc was not decreased.

This may be related to the fact that Na and Bi are contained in the main component of the present invention.

As is clear from Examples described above, a PTC thermistor having high reliability and a substantially constant high Curie temperature in a stable manner can be obtained in the present invention even if the composition is shifted to some degree.

In Example 9, various samples containing Y as the rare-earth element Ln and obtained by changing the molar amounts m, w, and x and the oxygen concentration in the nitrogen atmosphere during firing process were prepared, and the characteristics were evaluated.

$BaCO_3$, $CaCO_3$, $Na_2CO_3$, $Bi_2O_3$, $TiO_2$, and $Y_2O_3$, which were raw materials of a main component, were prepared and then weighed and mixed to obtain a mixed powder so that the sintered body had the composition shown in Table 10.

After that, sample Nos. 81 to 89 were prepared by the same method and process as those in Example 1 except that the firing process was performed in a nitrogen atmosphere whose oxygen concentration was 5000 ppm by volume.

Regarding the sample Nos. 81 to 89, the electrical resistivity $\rho_0$ at 25° C. (room temperature), the number of digits of PTC $\Delta R$, the Curie temperature Tc, and the percentage change in resistivity $\Delta\rho/\rho_0$ were determined by the same method and process as those in Example 1.

Table 10 shows the compositions and measurement results of the sample Nos. 81 to 89. The composition and measurement results of the sample No. 26 are also shown for comparison.

As in Example 1, samples having a percentage change in resistivity $\Delta\rho/\rho_0$ of 30% or less were judged as good.

TABLE 10

Composition formula: $(Ba_{0.848-w-x}Na_wBi_xCa_{0.15}Y_{0.002})_mTiO_3 + 0.00025$ Mn

| Sample No. | m | w | x | Electrical resistivity $\rho_0$ ($\Omega \cdot cm$) | Number of digits of PTC $\Delta R$ | Curie temperature Tc (° C.) | Percentage change in resistivity $\Delta\rho/\rho_0$ (%) |
|---|---|---|---|---|---|---|---|
| 26 | 1.000 | 0.05 | 0.05 | 12 | 4.8 | 158 | 8 |
| 81 | 1.000 | 0.10 | 0.10 | 19 | 5.6 | 182 | 15 |
| 82 | 1.000 | 0.075 | 0.075 | 17 | 5.3 | 169 | 10 |
| 83 | 1.000 | 0.04 | 0.04 | 15 | 4.5 | 150 | 11 |
| 84 | 1.000 | 0.03 | 0.03 | 14 | 4.3 | 146 | 12 |
| 85 | 1.000 | 0.02 | 0.02 | 9 | 4.0 | 143 | 15 |
| 86 | 1.000 | 0.01 | 0.01 | 7 | 3.9 | 139 | 14 |
| 87 | 1.000 | 0.051 | 0.049 | 18 | 5.2 | 153 | 13 |
| 88 | 0.992 | 0.05 | 0.05 | 19 | 4.7 | 156 | 9 |
| 89 | 1.004 | 0.05 | 0.05 | 10 | 4.1 | 161 | 5 |

It was found from the sample Nos. 81 to 86 and the sample No. 26 that in the case where the molar amount m was 1.000, the molar amount y of Ca was 0.15, and the total molar amount (w+x) of Na and Bi was 0.02 to 0.20, the percentage change in resistivity $\Delta\rho/\rho_0$ was a satisfactory value of 15% or less and the electrical resistivity $\rho_0$ was a satisfactory value of 20 $\Omega \cdot cm$ or less.

It was confirmed from the sample No. 87 that solving of the problems of the present invention was not affected by a slight shift of the ratios of Na and Bi from a stoichiometric ratio (w=x=0.05).

It was also found from the sample Nos. 88 and 89 that satisfactory results were obtained even if the molar ratio m was varied in the range of 0.992 to 1.004. Therefore, it was confirmed that by adding a predetermined rare-earth element of the present invention within a predetermined range and setting the content of Ca in the A site to be 0.05 to 0.20, the molar amount m was not limited to a stoichiometric ratio.

| | |
|---|---|
| 1 | component body |
| 2a, 2b | outer electrode |

The invention claimed is:

1. A lead-free semiconductor ceramic that substantially does not contain Pb, the semiconductor ceramic comprising:
a barium titanate-based composition, as a main component, having a perovskite structure represented by general formula $ABO_3$,
wherein part of the A site Ba is replaced with Na, Bi, Ca, and a rare-earth element having an ionic radius smaller than that of the Na,
the content of the rare-earth element when the total number of moles of the elements constituting the A site is 1 mole is 0.0005 to 0.015 on a molar basis, and
the content of the Ca when the total number of moles of the elements constituting the A site is 1 mole is 0.05 to 0.20 on a molar basis.

2. The semiconductor ceramic according to claim 1, wherein the content of the Ca is 0.125 to 0.175 on a molar basis.

3. The semiconductor ceramic according to claim 2, wherein the rare-earth element is at least one member selected from the group consisting of Dy, Y, Ho, and Er.

4. The semiconductor ceramic according to claim 3, wherein the rare-earth element is more than one member of said group.

5. The semiconductor ceramic according to claim 2, additionally containing Mn.

6. The semiconductor ceramic according to claim 1, wherein the rare-earth element is at least one member selected from the group consisting of Dy, Y, Ho, and Er.

7. The semiconductor ceramic according to claim 6, wherein the rare-earth element is more than one member of said group.

8. The semiconductor ceramic according to claim 1, additionally containing Mn.

9. The semiconductor ceramic according to claim 1, having the compositional formula $$(Ba_{1-w-x-y-z}Na_wBi_xCa_yLn_z)_mTiO_3+nMn$$

wherein Ln is at least one member selected from the group consisting of Dy, Y, Ho, and Er, $0.05 \leq y \leq 0.20$, $0.0005 \leq z \leq 0.015$, $0.02 \leq (w+x) \leq 0.20$, $0.992 \leq m \leq 1.004$, and n is 0 or $0.0001 \leq n \leq 0.0020$.

10. A positive temperature coefficient thermistor comprising a component body and a pair of outer electrodes thereon wherein the component body comprises the semiconductor ceramic according to claim 9.

11. A positive temperature coefficient thermistor comprising a component body and a pair of outer electrodes thereon wherein the component body comprises the semiconductor ceramic according to claim 8.

12. A positive temperature coefficient thermistor comprising a component body and a pair of outer electrodes thereon wherein the component body comprises the semiconductor ceramic according to claim 7.

13. A positive temperature coefficient thermistor comprising a component body and a pair of outer electrodes thereon wherein the component body comprises the semiconductor ceramic according to claim 6.

14. A positive temperature coefficient thermistor comprising a component body and a pair of outer electrodes thereon wherein the component body comprises the semiconductor ceramic according to claim 5.

15. A positive temperature coefficient thermistor comprising a component body and a pair of outer electrodes thereon wherein the component body comprises the semiconductor ceramic according to claim 4.

16. A positive temperature coefficient thermistor comprising a component body and a pair of outer electrodes thereon wherein the component body comprises the semiconductor ceramic according to claim 3.

17. A positive temperature coefficient thermistor comprising a component body and a pair of outer electrodes thereon wherein the component body comprises the semiconductor ceramic according to claim 2.

18. A positive temperature coefficient thermistor comprising a component body and a pair of outer electrodes thereon wherein the component body comprises the semiconductor ceramic according to claim 1.

* * * * *